United States Patent

Hunt

[11] 4,249,770
[45] Feb. 10, 1981

[54] VEHICLE OPENING ROOFS

[75] Inventor: Keith R. Hunt, Birmingham, England

[73] Assignee: Britax Weathershields Limited, Birmingham, England

[21] Appl. No.: 14,170

[22] Filed: Feb. 22, 1979

[51] Int. Cl.³ ............................................. B60J 7/00
[52] U.S. Cl. .................................. 296/218; 296/219; 296/224
[58] Field of Search ........... 296/137 E, 137 F, 137 H, 296/137 G

[56] References Cited

U.S. PATENT DOCUMENTS

| | | | |
|---|---|---|---|
| 3,025,099 | 3/1962 | Werner | 296/137 F |
| 4,101,161 | 7/1978 | Currall | 296/137 H |

Primary Examiner—John J. Love
Assistant Examiner—John A. Carroll
Attorney, Agent, or Firm—Scrivener, Clarke, Scrivener and Johnson

[57] ABSTRACT

A vehicle opening roof comprises a frame which surrounds a longitudinal opening in the roof of a vehicle and a panel assembly which is guided between spaced parallel guide rails forming the side members of the frame. A transverse mounting member is slidably guided between the guide rails and incorporates a handle-operated locking mechanism for engagement with a front rail at the front end of the frame to lock the panel assembly in the closed position. The mounting member also incorporates a first bracket for connection to a rigid panel, a second bracket for connection to a rigid flap at the forward end of a flexible covering, and a transmission mechanism for connection to the flap and operable in synchronism with the handle-operated locking mechanism to draw the flap down into engagement with the roof at the front end of the opening.

3 Claims, 4 Drawing Figures

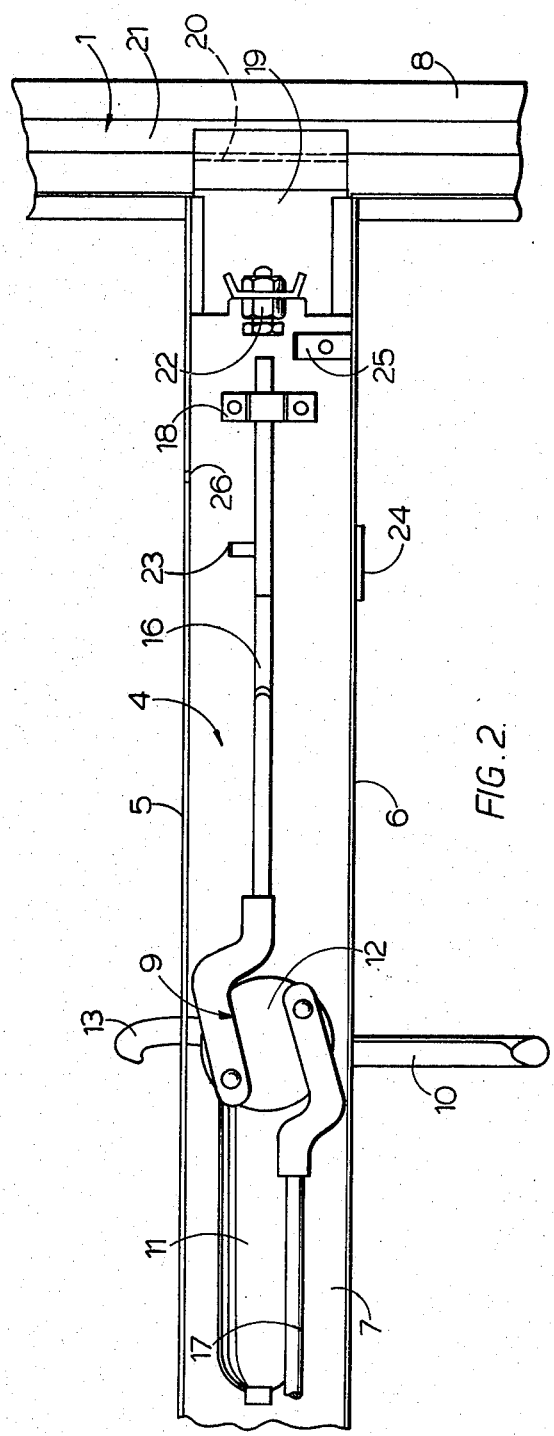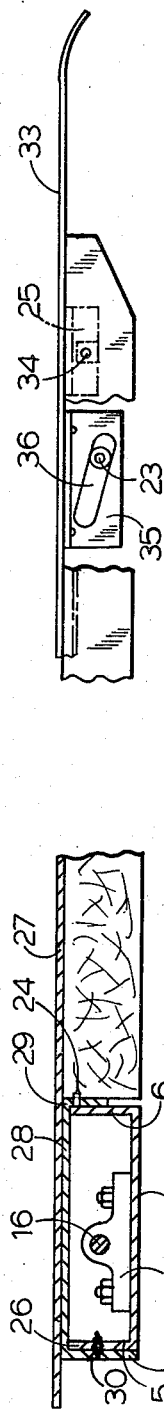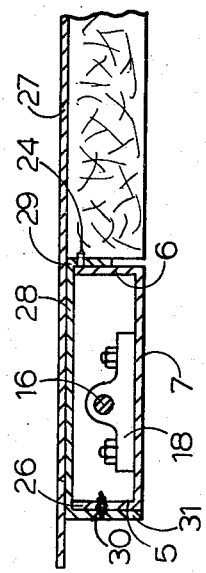

VEHICLE OPENING ROOFS

SPECIFIC DESCRIPTION

This invention relates to vehicle opening roofs of the kind in which a frame surrounds a longitudinal opening in the roof of a vehicle and a panel assembly is guided between spaced parallel guide rails forming the side members of the frame and adapted to extend along each side of the longitudinal opening.

In one known type of vehicle opening roof of the kind set forth the panel assembly may comprise a rigid panel which is slidably guided on the rails between a closed position, in which the opening is closed and the panel is flush with the surface of the roof so that its presence is not obvious, and an open position in which at least a portion at the forward end of the opening is exposed with the panel sliding under the fixed roof of the rear end of the opening. The extent to which the opening roof can open is limited to slightly less than one-half of the length of the frame with the portion at the rear of the frame under which the panel slides comprising a separate immovable in-fill panel. However, such a panel assembly provides a substantial construction which is entirely adequate for ventilation purposes.

In another construction of vehicle opening roof the panel assembly comprises a fabric covering which is connected at its rear end to the rear end of the frame. The covering is supported by a number of slidably mounted cross-members which are guided at opposite ends in the rails with the cross-member at the front end of the covering including a flap which is drawn down into close sealing engagement with the roof at the front end of the opening by handle-operated means when the panel assembly is in the closed position. Such an opening roof gives more the effect of a "convertible" by providing a larger exposed opening when the panel assembly is in its fully open position. However, such a roof is more apparent than a roof of the kind set forth incorporating a rigid panel, and may have a shorter life due to the effects of folding which the covering experiences in moving between open and closed positions in service.

It is the aim of the present invention to provide an opening roof of the kind set forth in which the panel assembly can be of the type comprising a rigid panel or a flexible fabric covering, and enable a panel assembly of one type to be replaced by a panel assembly of the other type at will.

According to our invention, in a vehicle opening roof of the kind set forth a transverse mounting member is slidably guided between the guide rails and incorporates handle-operated locking means for engagement with a front rail at the front end of the frame to lock the panel assembly in the closed position, and the mounting member incorporates a first bracket for connection to a rigid panel, a second bracket for connection to a rigid flap at the forward end of a flexible covering, and a transmission mechanism for connection to the flap and operable in synchronism with the handle-operated locking means to draw the flap down into engagement with the roof at the front end of the opening.

The first bracket and the locking means enable the roof to incorporate a sliding panel, and the second bracket and the transmission mechanism enable the roof to incorporate the fabric covering which is interchangeable with the sliding panel, and vice versa.

When the sliding panel is incorporated the rear half of the frame is closed by an in-fill panel and a sealing strip is provided between the edge of the panel and the side rails. When the fabric covering is incorporated the intermediate cross-members engage at the ends under aligned longitudinal flanges at intermediate points in the length of rails with the side edges of the covering extending over, and in slidable engagement with the roof on opposite sides of the opening.

In both constructions the rails comprising the frame have a continuous upstanding lip to define in the frame a water check channel.

Preferably the transverse mounting member also incorporates clamp shoes for engagement with the side rails to lock either panel assembly in an intermediate open position, also in response to operation of the locking means.

One embodiment of our invention is illustrated in the accompanying drawings in which:

FIG. 2 is a plan of a portion of a transverse mounting member with the rigid panel omitted;

FIG. 3 is a transverse section through the panel and the mounting member, substantially on the line 3—3 of FIG. 1; and FIG. 4 is a longitudinal section through the mounting member showing a portion of a rigid flap at the forward end of a panel assembly comprising a fabric covering.

Figure 1:
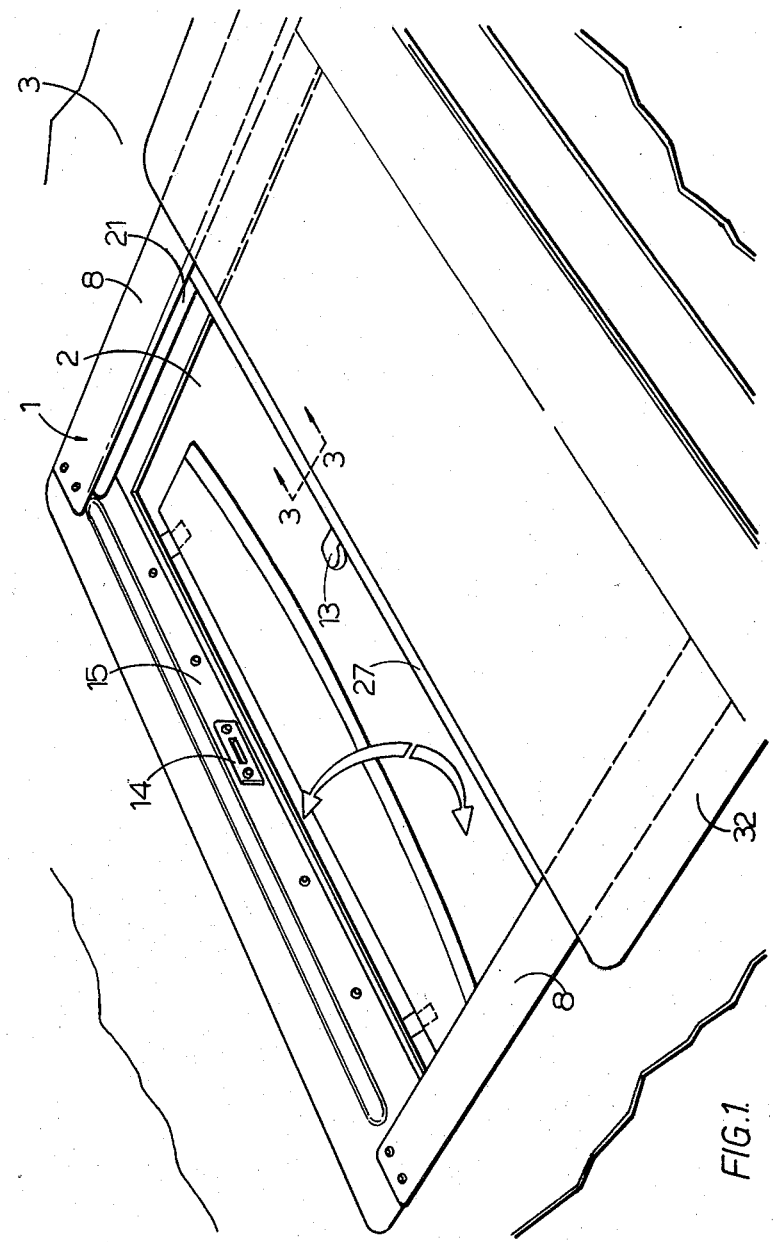
FIG. 1 is a perspective view of an opening roof for a vehicle incorporating a rigid panel.

In the roof illustrated in FIGS. 1 to 3 of the accompanying drawings a frame 1 surrounds an opening 2 in the roof 3 of a vehicle.

A transverse panel mounting member 4 is slidably mounted in the frame 1 for movement in a longitudinal direction with respect to the opening. The transverse mounting member 4 is of channel-section having a pair of spaced flanges 5, 6 which are upstanding from the transverse side edges of a base 7. The mounting member 4 is slidably guided at opposite ends in side guide rails 8 of the frame 1 on opposite sides of the opening 2 in the roof.

The mounting member 4 incorporates handle-operated locked means 9. The handle-operated locking means 9 comprises a boss which is rotatable by means of a handle 10 and is located in a recess 11 in the undersurface of the base 7 at substantially the mid-point in the length of the mounting member 4.

The boss is rotatable with a plate on the inner side of the mounting member 4. A second plate 12 is superimposed upon, and rigidly coupled to, the first plate. A hook 13 is eccentrically mounted on the first plate for engagement with a keeper 14 mounted in a front rail 15 of the frame. Two rods 16, 17 are housed within the mounting member 4 and are coupled at their inner ends to substantially diametric points on the second plate 12. The rods 16, 17 are slidably guided through fittings 18 on the base of the mounting member 4 so that rotation of the second plate 12 causes the rods 16, 17 to move relatively towards or away from each other, substantially in a transverse direction with respect to the frame 1.

A pair of clamp shoes 19 slidably mounted on opposite ends of the mounting member 4 include axial slots 20 which slidably receive longitudinally extending flanges 21 on the side guide rails 8, which are located in a common plane normal to vertical flanges of the rails. The free ends of the rods 16, 17 are engageable through adjusting screws 22 with the inner ends of the shoes 19 to clamp the shoes 19 into engagement with the flanges 21 when the handle 10 is urged into a locking position in which it is received wholly within the recess 11 and the hook 13 is retracted.

The rods 16, 17 are provided at intermediate points in their lengths with forwardly extending parallel lugs or spurs of which only one spur 23 is shown.

The rearmost flange 6 of the mounting member is provided with a pair of rigid tongues of which one is shown at 24 and which extend rearwardly from its upper edge. In addition a pair of cranked resilient or otherwise sprung strips 25 are located at spaced positions on the inner face of the rearmost flange 6.

The forward flange 5 of the mounting member is provided with a pair of spaced openings 26 which may be tapped.

When the roof is to be provided with a rigid panel 27 as shown in FIGS. 1 to 3 the panel is provided at a forward position with a recess 28 of suitable dimensions to receive the mounting member 4. The recess is provided by a channel member of which a rear transverse wall 29 has spaced notches which receive the tongues 24 on the rearmost flange 6 of the mounting member 4, and the installation of the panel is completed by screwing two screws 30 through a flange 31 at the forward edge of the panel 27 into the pre-formed openings 26 in the forward flange 5 of the mounting member 4.

A sealing strip not shown surrounds the panel 27 and provides a seal between it and the vertical flange of the front and side rails 15 and 8. The sealing strip has a main body part provided with a pair of substantially diametrically opposed lips which engage with the side flanges of the rails above the intermediate flanges and with the intermediate flanges themselves.

In this construction the panel 27 slides under an in-fill panel 32 secured between a rear rail of the frame 1 and portions of the side rails 8 at the rear of the frame 1, for substantially one half of the length of the side rails 8.

When the panel 27 is in a fully closed position ramps in the side rails raise the panel 27 to the same level as the in-fill panel 32 so that its presence is not obvious. In this position the engagement of the hook 13 with the keeper 14 clamps the forward edge of the panel firmly against the front rail 15, and the clamp shoes 19 are firmly clamped into engagement with the guide rails 8. This ensures that the roof cannot be opened from the exterior of the vehicle since the rear of the panel 27 has been raised by the ramps, and the forward edge of the panel 27 has been urged into firm engagement with the front rail 15.

To open the roof, the handle 10 is withdrawn from the recess 11 and then rotated. This releases the hook 13 and clamp forces applied to the shoes 19 through the rods 16, 17. The panel 27 can then be opened fully or moved into any intermediate position at which return movement of the handle 10 into the recess 11 operates the locking means 9 to clamp the shoes 19 against the rails 8 thereby clamping the panel 27 against movement with respect to the frame 1 in this open position.

To replace the panel 27, only the screws 30 at its forward edge have to be removed. Thereafter, the panel is simply detached from the mounting member 4 by withdrawing the notches 29 from the tongues 24. After the in-fill panel 32 has been removed, the frame which is then wholly exposed, can be provided with a flexible fabric covering.

To fit a flexible fabric covering to an exposed frame, the covering has a rigid transverse sheet metal or other substantially rigid flap 33 at its forward edge, and is supported at spaced points in its length in a known manner by intermediate cross-members. The transverse flap 33 is also provided with threaded bosses 34 for connection to the spring strips 25 of the rearmost flange 6 and downwardly depending flanges 35 each containing oppositely inclined elongate slots 36 to receive the lugs or spurs 23 on the rods 16, 17.

To install the fabric covering the ends of the intermediate cross-members are engaged underneath the flanges 21 with which the clamp shoes 19 engage and the rear end of the fabric covering is secured to the rear rail of the frame 1 by means of suitable detachable screws.

The threaded bosses 34 are connected to the spring strips 25 and the lugs or spurs 23 are received in the inclined slots 36.

The direction of inclination of the slots 36 is chosen such that as the rods 16, 17 are moved apart in response to movement of the handle 10 in a locking direction, the flap 33 is pulled down into engagement with at least the upper surfaces of the side rails 8 over which the side edges of the fabric covering also overlie.

To open the roof the handle 10 is released to disengage the hook 13 from the keeper 14 and the shoes 19 from the rails 8. The covering can then be moved rearwardly to expose a smaller or greater part of the opening 2. Movement of the handle 10 in the locking direction is operative to operate the clamp shoes 19, and to urge the flap 33 into clamping engagement with the rails 8.

To close the roof the sequence described is reversed. Engagement of the hook 13 with the keeper 14 draws the fabric forwardly to tighten the covering. The flap 33 is also drawn down into engagement with the roof 3 at the fron of the opening 2 with the mounting member 4 clamped against movement with respect to the frame by the clamp shoes 19.

Removal of the covering for maintenance or for replacement by a rigid panel 27 can be achieved simply by detaching the flap 33 from the mounting member 4, disengaging the cross-members from the flanges and disconnecting the covering from the rear rail of the frame.

I claim:

1. A vehicle opening roof comprising a rectangular frame for surrounding a longitudinal opening in a roof of a vehicle, said frame comprising side members constituted by spaced parallel guide rails adapted to extend along each side of said opening, a front rail adapted to extend along the front end of said opening, and a rear rail adapted to extend along the rear end of said opening, a panel assembly guided between said guide rails, and a transverse mounting member slidably guided between said guide rails and incorporating a handle-operated locking mechanism for engagement with said front rail to lock said panel assembly in a closed position; said panel assembly being selectable from the group comprising:

a sliding panel together with an in-fill panel for closing the rear half of said frame, a sealing strip being provided between the edge of said panel and said side member of said frame; and a flexible fabric covering, intermediate cross-members engaging at their ends with said guide rails, and a rigid flap at the forward end of said fabric covering, side edges of said fabric covering extending over, and in slidable engagement with, said roof of said vehicle on opposite sides of said opening; and said mounting member also incorporating a first bracket for detachable connection to said rigid panel, a second bracket for detachable connection to said rigid flap at the forward end of said flexible covering, and a transmission mechanism for connection to said flap and operable in synchronism with said handle-operated locking mechanism to draw said flap down into engagement with said roof of said vehicle at the front end of said opening.

2. A vehicle opening roof as claimed in claim 1, wherein said transverse mounting member incorporates clamp shoes for engagement with said side rails to lock said panel assembly in an intermediate open position, also in response to operation of said locking mechanism.

3. A vehicle opening roof as claimed in claim 1, wherein said transverse mounting member is of channel-section having a base, and a pair of spaced front and rear flanges which are upstanding from transverse side edges of said base, said first bracket projects rearwardly from the upper edge of said flange, said second bracket projects forwardly from said rear flange and said transmission mechanism comprises a pair of rods which are movable axially towards and away from each other and which carry parallel forwardly directed projections received in inclined slots depending from said flap.

* * * * *